United States Patent
Puzic et al.

(10) Patent No.: US 12,462,051 B2
(45) Date of Patent: Nov. 4, 2025

(54) USER IDENTITY RISK SCORE GENERATION IN AN ENTERPRISE NETWORK

(71) Applicant: SpyCloud, Inc., Austin, TX (US)

(72) Inventors: Alen Puzic, Austin, TX (US); David Endler, Austin, TX (US)

(73) Assignee: SpyCloud, Inc., Austin, TX (US)

( * ) Notice: Subject to any disclaimer, the term of this patent is extended or adjusted under 35 U.S.C. 154(b) by 120 days.

(21) Appl. No.: 18/152,186

(22) Filed: Jan. 10, 2023

(65) Prior Publication Data

US 2024/0232394 A1    Jul. 11, 2024

(51) Int. Cl.
  *G06F 21/60*    (2013.01)
  *G06F 21/31*    (2013.01)

(52) U.S. Cl.
  CPC .......... *G06F 21/604* (2013.01); *G06F 21/316* (2013.01); *G06F 2221/2141* (2013.01)

(58) Field of Classification Search
  CPC ................. G06F 21/604; G06F 21/316; G06F 2221/2141
  See application file for complete search history.

(56) References Cited

U.S. PATENT DOCUMENTS

| | | | | |
|---|---|---|---|---|
| 2012/0278249 A1* | 11/2012 | Duggal | ................. | G06Q 40/08 705/325 |
| 2014/0007179 A1* | 1/2014 | Moore | ................... | H04L 63/10 726/1 |
| 2020/0042679 A1* | 2/2020 | Fuentes | ................... | H04W 8/18 |
| 2020/0304536 A1* | 9/2020 | Mahabir | .............. | H04L 63/1475 |
| 2022/0027498 A1* | 1/2022 | Vandanapu | ........... | H04L 9/0643 |
| 2022/0030382 A1* | 1/2022 | Klasson | ................ | G06F 40/174 |
| 2022/0407849 A1* | 12/2022 | Endler | .................... | H04L 63/20 |
| 2023/0224277 A1* | 7/2023 | Tarighat | .............. | H04L 63/1425 726/15 |
| 2024/0126761 A1* | 4/2024 | Tummala | ............ | G06F 16/2471 |

OTHER PUBLICATIONS

Tostenrude et al. "Performing batch fraud predictions using Amazon Fraud Detector, Amazon S3, and AWS Lambda." in AWS Machine Learning Blog [online]. Oct. 21, 2020 [retrieved on Oct. 24, 2024]. Retrieved from the Internet: https://aws.amazon.com/blogs/machine-learning/performing-batch-fraud-prediction (Year: 2020).*

* cited by examiner

*Primary Examiner* — Carl G Colin
*Assistant Examiner* — Zhe Liu
(74) *Attorney, Agent, or Firm* — Pillsbury Winthrop Shaw Pittman, LLP

(57) ABSTRACT

A process that includes receiving an identity risk query for a user, accessing a security database of available user information associated with a plurality of users, and identifying that the user is associated with first available user information of the available user information included in the security database. The process also includes generating a first identity risk score for the user based on the first available user information, and providing the first identity risk score in response to the identity risk query.

34 Claims, 8 Drawing Sheets

USER IDENTITY RISK SCORE GENERATION IN AN ENTERPRISE NETWORK

CROSS-REFERENCE TO RELATED APPLICATIONS

None

BACKGROUND

1. Field

The present disclosure relates generally to cybersecurity and, more specifically, to generating an identity risk score for a user interacting with an enterprise network.

2. Description of the Related Art

Computer-security professionals are losing the battle to prevent use of stolen or otherwise exposed security credentials, such as passwords, by which users are authenticated by computer networks. In part, this is due to poor, prevalent password hygiene. People tend to reuse passwords or use low-entropy variations. And these passwords (a term used generically herein to refer to knowledge-factor and biometric security credentials), along with associated user identification, can be easily exposed or stolen, which can help threat actors access various sensitive accounts related to a user. A report by Verizon™ in 2017 indicated that 81% of hacking-related breaches leveraged either stolen or weak passwords and in July 2017 Forrester™ estimated that account takeovers would cause at least $6.5 billion to $7 billion in annual financial losses across industries. Other attack vectors include brute force attacks. Modern GPU's and data structures like rainbow tables facilitate password cracking at rates that were not contemplated when many security practices were engineered. Malicious actors can sell resulting tested credentials on the dark web, making it relatively easy to monetize user credentials and incentivizing even more password cracking. Various malicious buyers of this information may use password and user identification combinations in order to breach and retrieve highly confidential information.

To impede these attacks, online services like "Have I Been Pwned" have arisen. Such systems maintain a database of breached credentials and expose an interface by which the records may be interrogated by users seeking to determine if their credentials have been compromised. Such systems, however, are often too rarely accessed, particularly in the context of enterprise networks, where highly valuable information can be exfiltrated relatively quickly after credentials are compromised. And responses to detected threats are often not fully implemented, as propagating appropriate changes throughout an enterprise network can be relatively high-latency and complex.

SUMMARY

Accordingly, there is a need to be able to efficiently and proactively retrieve exposed or stolen, sensitive, or confidential information associated with a user identification and determine a user's identity risk as being a legitimate user but with a high likelihood of a loss of data or that the user is an illegitimate user posing as a legitimate user.

The following is a non-exhaustive listing of some aspects of the present techniques. These and other aspects are described in the following disclosure.

Some aspects include a process, including: obtaining, by a computer system, an identity risk query identifying a user identification of a user; retrieving, by the computer system and from a security database of compromised user information associated with a plurality of users, first compromised user information associated with the user identification; generating, by the computer system, a first identity risk score for the user based on the first compromised user information; and providing, by the computer system, the first identity risk score in response to the identity risk query.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
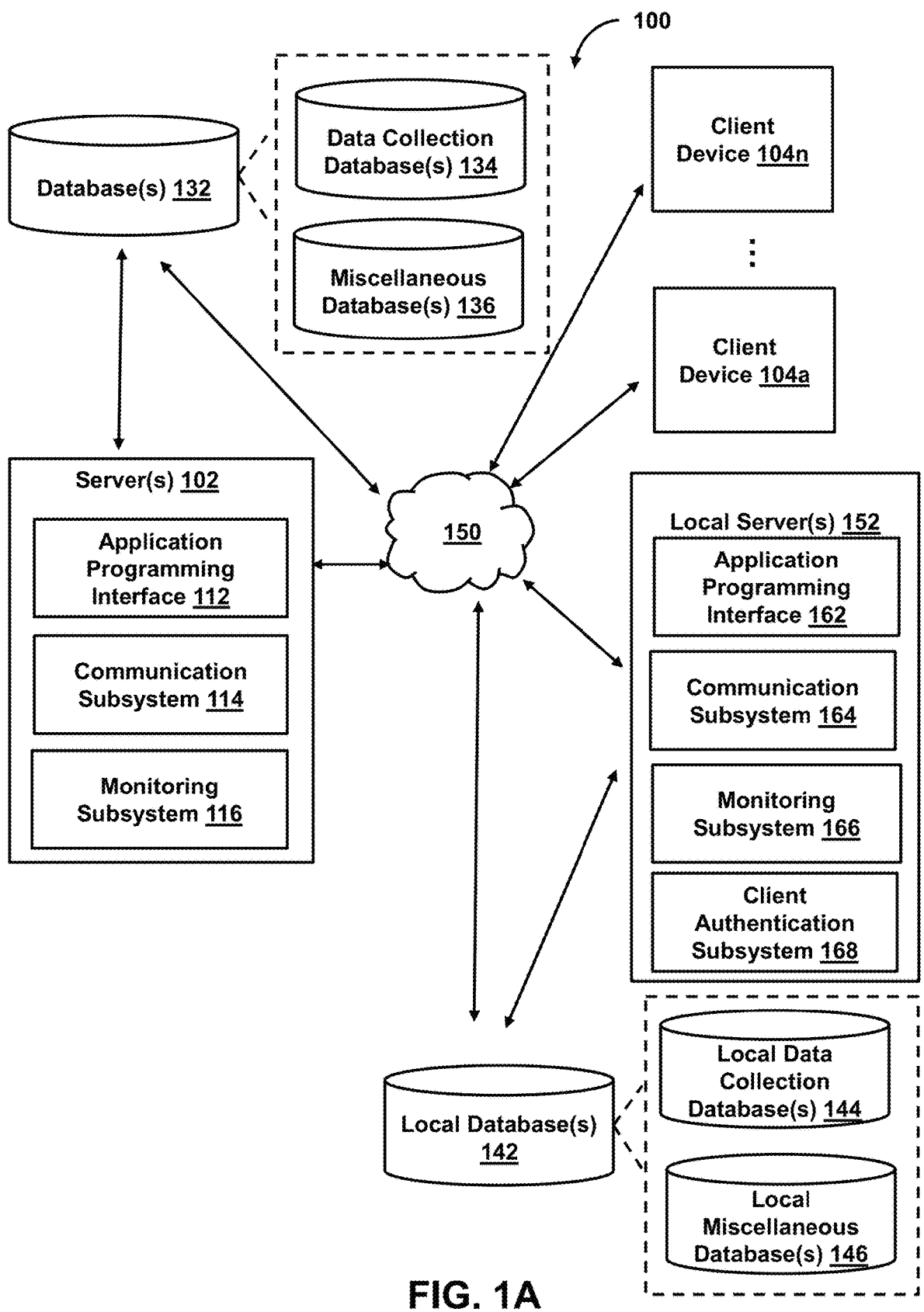
FIG. 1A is a logical and physical architecture block diagram showing an example system for facilitating an assessment of identity risk of a user of an enterprise computing system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cybersecurity. Indeed, the inventors wish to emphasize the difficulty of recognizing those problems that are nascent and will become much more apparent in the future should trends in industry continue as the inventors expect. Further, it should be understood that some embodiments are problem-specific, and not all embodiments address every problem with traditional systems described herein or provide every benefit described herein. That said, improvements that solve various permutations of these problems are described below. Some aspects of the present techniques may be described below under different headings in all-caps. These techniques may be used together or independently (along with the description above), which is not to suggest that other descriptions are limiting.

Online fraud threats have skyrocketed in recent years, with losses now predicted to exceed $206 billion by 2025. As fraud increases in both prevalence and sophistication, even enterprises with strong fraud prevention programs struggle to confidently distinguish real consumers from cybercriminals. Enterprises are missing a crucial element in their control frameworks: visibility of stolen information that enables criminals to evade detection and perpetrate account takeover, identity fraud, and new account fraud. Without a complete view of customers' risk, inaccurate decisions can result in revenue lost to fraud, false positives, unnecessary friction, time wasted on manual reviews, and negative customer experiences.

Some embodiments mitigate the above-described issues (or other problems described below or that will be self-evident to those in the field) by integrating a repository of available user information assets that may include breached credentials, other breached sensitive user information, passkey information or other FIDO and WebAuthn security standard based security information that may be used to bypass a passkey authentication, or other user information that indicates fraudulent activity within enterprise computing systems that manage identity, authenticate users, or otherwise authorize access to secure computing resources based on security credentials. Some embodiments are configured to generate an identity risk score that indicates an extent that a user, associated with a particular user identification, has the potential to be a security threat to the enterprise either inadvertently or directly. In some cases, user information data assets may be obtained, and the identity risk score can be generated in real-time (e.g., within 500 milliseconds, 5 seconds, or 5 minutes of when an identity risk query is received). Based on the identity risk score, enterprises may be able to use the identity risk score in their own risk engines or perform a security action based on an interaction point (e.g., account set up, login, payment and the like) of the user in a user interaction cycle with the enterprise. It should be noted, though, that several independently useful techniques are described herein, and embodiments consistent with the present disclosure are not limited to those that implement this approach, which is not to suggest that any other description is limiting.

FIG. 1A illustrates a computing environment 100 having components configured to generate an identity risk score for users of enterprise computing resources based on assessments of breached user data, breached credential, or other user information assets that may be useful in detecting risk of malicious activity, in accordance with some embodiments. For example, the identity risk score may indicate whether a legitimate user is at risk of causing a security threat inadvertently (e.g., infected by malware or at risk of account takeover) or whether a user is an illegitimate user that has ill intentions (e.g., synthetic identity). As illustrated in FIG. 1A, computing environment 100 may include servers 102, client devices 104a-104n, databases 132, local databases 142, and local servers 152. The server 102 may expose an application programming interface (API) 112 such as an identity risk API and include a communication subsystem 114 and a monitoring subsystem 116. The monitoring subsystem 116 may include an identity risk engine that may perform the functionalities of the identity risk engines or servers 102 discussed in more detail below (e.g., receive identity risk API calls, obtaining user information assets based on a user identification in the identity risk API calls, generating a identity risk score for a user from the obtained user information assets, and providing the identity risk score in response to the identity risk API call). Local server 152 may expose an API 162 and include a communication subsystem 164, a monitoring subsystem 166, a client authentication subsystem 168, or other components (which is not to suggest that other lists are limiting). In some embodiments, the local servers 152 may include a risk engine used by an enterprise to determine risk of their users. That risk engine may incorporate the identity risk score generated by server 102 when assessing user risk.

Three client devices are shown, but commercial implementations are expected to include substantially more, e.g., more than 100, more than 1,000, or more than 10,000. Each client device 104 may include various types of mobile terminal, fixed terminal, or other device. By way of example, client device 104 may include a desktop computer, a notebook computer, a tablet computer, a smartphone, a wearable device, or other client device. Users may, for instance, use one or more client devices 104 to interact with one another, one or more servers, or other components of computing environment 100. It should be noted that, while one or more operations are described herein as being performed by particular components of server 102 or local server 152, those operations may, in some embodiments, be performed by other components of server 102, local server 152, or other components of computing environment 100. As an example, while one or more operations are described herein as being performed by components of server 102 or local server 152, those operations may, in some embodiments, be performed by components of client device 104. Further, although the database 132 and local database 142 are illustrated as being separate from the server 102, local server 152, and the client device 104, the database 132 and the local database 142 may be located within the client device 104, server 102, or local server 152.

Figure 1B:
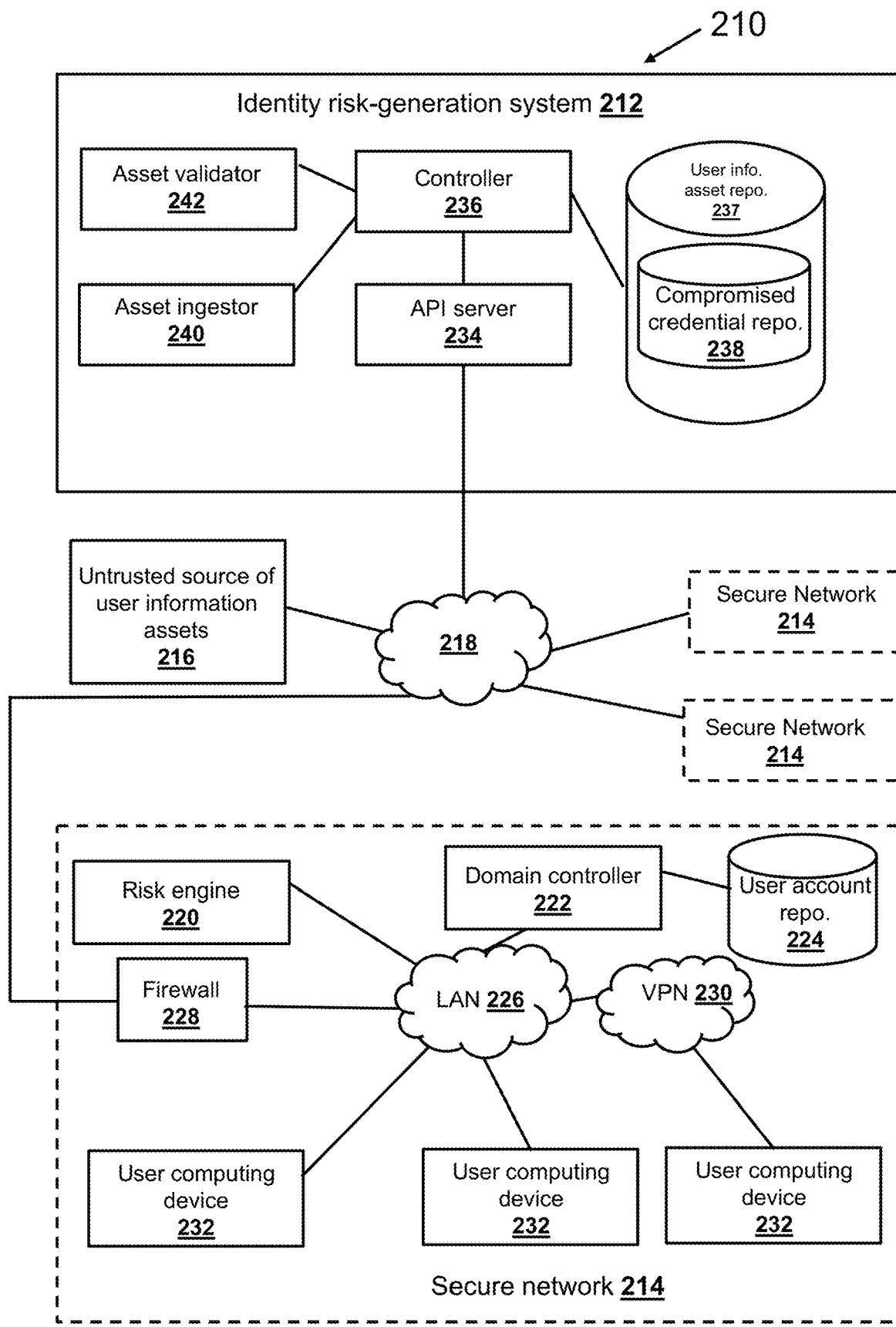
FIG. 1B is a logical and physical architecture block diagram showing another example system for determining identity risk, in accordance with some embodiments of the present disclosure.

FIG. 1B is a logical and physical architecture block diagram showing another example of a computing environment 210 having an identity risk-generation system 212 and a risk engine 220 configured to mitigate some of the above-described problems. In some embodiments, the computing environment 210 is, in some aspects, a more specific version of that described above. In some embodiments, the computing environment 210 includes the identity risk-generation system 212, a plurality of different secure networks 214, an untrusted source of leaked user information assets 216, and a public network, like the Internet 218.

Three secure networks 214 are shown, though embodiments are consistent with substantially more. In some embodiments, each secure network 214 may correspond to a different secure network of a different tenant account subscribing to services from the identity risk-generation system 212, for example, in a software as a service offering, or some embodiments may replicate some or all of the system 212 on-premises. In some embodiments, each of the secure networks 214 may define a different secure network domain in which authentication and authorization determinations are independently made, for instance, a user authenticated on one of the secure networks 214 may not be afforded any privileges on the other secure networks 214 in virtue of the authentication. In some cases, each secure network 214 may be a different enterprise network, for instance, on a private subnet hosted by a business or other organization.

In some embodiments, the secure network 214 may include the above-noted risk engine 220, a domain controller 222, a user account repository 224, a private local area network 226, a firewall 228, a virtual private network connection 230, various user computing devices 232, and in some cases various network-accessible resources hosted within the secure network for which access is selectively granted by the domain controller 222 responsive to authorization and authentication determinations based on user credentials. Generally, authentication is based on confirming the identity of an entity, and authorization is based on whether that entity is permitted to access resources in virtue of being authenticated. In some embodiments, the user computing devices 232 may be physically co-located, or some user computing devices may be remote, for instance, those connecting via a virtual-private network (VPN) connection 230. Three user computing devices 232 are shown, but commercial implementations are expected to include substantially more, and in some cases with substantially more remote computing devices connecting via a plurality of different VPN connections. In some embodiments, the local area network 226 may be addressed by a range of private Internet Protocol addresses assigned to the various illustrated computing devices, and in some cases, those same private Internet Protocol addresses may be used on other secure networks 214, for instance, behind a network address translation table implemented by the firewall 228 or a router.

In some embodiments, the domain controller 222 is an Active Directory™ domain controller or other identity management service configured to determine whether to service authentication requests from user computing devices 232 or other network resources (e.g., computing devices hosting services to which the devices 232 seek access). In some embodiments, the domain controller 222 may receive requests including a username and one or more security factors, like a knowledge factor credential, such as a password, a pin code, or in some cases, a value indicative of a biometric measurement. The terms "password" and "credential" refer both to the plain-text version of these values and cryptographically secure values based thereon by which possession of the plain-text version is demonstrated, e.g., a cryptographic hash value or ciphertext based on a password. Thus, in some embodiments, these inputs may be received in plain text form, or cryptographic hash values based thereon, for instance, calculated by inputting one of these values and a salt value into a SHA 256 cryptographic hash function or the like, may serve as a proxy.

In some embodiments, the domain controller 222 may respond to authentication requests by retrieving a user account record from the repository 224 corresponding to the username (a term which is used to refer broadly to refer to values, distinct from knowledge-factor credentials, by which different users are distinguished in a username space, and which may include pseudonymous identifiers, email-addresses, and the like) in association with the request. In some embodiments, in response to the request, the domain controller 222 may determine whether a user account associated with the username (e.g., uniquely associated) indicates that the user account has a valid set of credentials associated therewith, for instance, that a password has been registered and has not been designated as deactivated, e.g., by setting a flag to that effect in the account to deactivate a previously compromised (e.g., breached, phished, or brute forced) password. In response to determining that the user account does not have a valid set of credentials associated therewith, some embodiments may respond to the requests by denying the request and supplying instructions to populate a user interface by which new credentials may be registered and stored in the user account.

In some embodiments, in response to determining that the user account has valid credentials, the domain controller 222 may then determine whether the credentials associated with the request for authentication match those in the user account record, for instance, whether the user demonstrated possession of a password associated with the username in the user account. Possession may be demonstrated by supplying the password in plain text form or supplying a cryptographic hash thereof. In some embodiments, passwords are not stored in plaintext form in the user account repository and cryptographic hashes of passwords in the user account are compared to cryptographic hashes of user input credentials to determine whether the user has demonstrated possession of the password. In response to determining that the credentials associated with the request do not match those in the user account, in some embodiments, the domain controller 222 may respond to the request by transmitting a signal indicating that the request is denied to the requesting computing device 232.

In some embodiments, in response to determining that the credentials supplied with the request match those in the user account, some embodiments may respond to the request by authenticating the user and, in some cases, authorizing (or causing other services to authorize) various forms of access to network resources on the secure network, including access to email accounts, document repositories, network attached storage devices, and various other network-accessible services accessible (e.g., exclusively) on the secure network 214 (e.g., selectively based on the requestor's identity). As described herein such workflows may be referred to as a user interaction cycle that may include a plurality of user interaction points (e.g., authenticating a user, changing user settings or information, completing purchases or other transactions, user account creation, or other sensitive interaction points in a user interaction cycle with enterprise computing resources. In some embodiments, upon authentication, various computing devices on the secure network 214 may indicate to one another that they are authorized to access resources on one another or otherwise communicate, e.g., with the Kerbos security protocol, such as the implementation described in RFC 3244 and RFC 4757, the contents of which are hereby incorporated for by reference.

In some embodiments, the risk engine 220 and the identity risk-generation system 212 may be co-located on the same secure network 214, or in some cases portions may be implemented as a software as a service model in which the same identity risk-generation system 212 is accessed by a plurality of different secure networks 214 hosted by a plurality of different tenants. The risk engine 220 and the identity risk-generation system 212 collectively form an example of a distributed application that is referred to as a distributed identity risk assessment application. Other examples of such an application are described with reference to FIG. 1A. The components are described as services in a service-oriented architecture (e.g., where different functional blocks are executed on different network hosts (or collections thereof) and functionality is invoked via network messages). But embodiments are consistent with other design patterns, e.g., the risk engine 220 and the domain controller 222 may be integrated in the same host or process, the risk engine 220 may operate as an agent on each of the user computing devices, or the risk engine 220, the domain controller 222, and the identity risk-generation system 212 may be integrated on a single host or process.

In some embodiments, the identity risk-generation system 212 may include an application program interface (API) server 234, such as a nonblocking server monitoring a network socket for API requests and implementing promises, callbacks, deferreds, or the like. In some embodiments, the controller 236 may implement the processes described herein by which user information is obtained, and in some cases cracked, validated, stored, and interrogated. In some embodiments, at the direction of the controller 236, for instance responsive to commands received via the API server 234, user information assets stored in a user information asset repository 237 may be interrogated to return an updated full set, or result of comparison to user information determined to have been potentially compromised or indicating malicious behavior with the techniques described herein. In some embodiments, the user information asset repository 237 may include a compromised credential repository 238 or other repositories that are subcategories of the user information assets received. In some embodiments, the controller 236 is further configured to ingest user information assets with an asset ingestor 240 from various remote sources, such as an untrusted source of user information assets 216 via the Internet 218. Examples of sources of user information assets are described below and include various repositories on the dark web. In some embodiments, received user information assets may undergo various types of processing with the asset validator 242, for instance, de-duplicate user information with those previously determined to have been retained, cracking credentials published in encrypted form, mapping user identifiers, or associating credentials with other user identifiers. Results may be stored in the user information asset repository 237 and in some cases, one or more the above-described data structures by which user information assets are compared with those in user account repository 224 may be updated.

The systems of FIGS. 1A and 1B may execute various processes like those described below, though the following processes are not limited by the above implementations, which is not to suggest that any other description herein is limiting. It should be noted that the various processes executed by one or more components of the secure network 214 in FIG. 1B may be executed by one or more of local server 152, client device 104, and local database 142 in FIG. 1A (or vice versa), and the various processes executed by one or more components of the identity risk-generation system 212 in FIG. 1B may be executed by one or more of server 102 and database 132 in FIG. 1A (or vice versa). In other words, the above or below discussed processes executed by one or more components of the computing environment 210 may be executed by one or more components of the computing environment 100 (or vice versa).

Obtaining Compromised Confidential Information

Various approaches may be executed to obtain user information assets such as compromised (e.g., breached, brute forced, or phished) confidential information, like compromised credentials, leaked personally identifiable information (like social security numbers), passkey information or other FIDO and WebAuthn security standard based security information that may be used to bypass a passkey authentication, or financial credentials like account numbers, for purposes of detecting that the information has been compromised. In some example, malware accessing memory could compromise a passkey, as well as the passkey itself. The database 132 and local database 142 illustrated in FIG. 1A or the user information asset repository 237 of FIG. 1B may be populated by collecting data from a plurality of sources and using a plurality of data collection techniques. Although a user information asset repository 237 and a compromised credential repository 238 is illustrated in FIG. 1B as being part of an identity risk-generation system 212, it should be understood that secure network 214 may also include another repository including compromised credentials (i.e., the compromised credentials stored in the compromised credential repository 238). Data corresponding to leaked or stolen user information assets (including user credentials) may be collected using multiple techniques and from many sources. Some of the techniques for collecting leaked or stolen user information assets include (a) human intelligence (HUMINT) and applied research (HUMINT+TECHNOLOGY) and (b) scanners and automatic collection tools. HUMINT is an information gathering technique that uses human sources, and may include such a human source acquiring a copy of a set of compromised credentials from the dark web. Both the techniques noted above may be implemented in some cases. Although the scanners and automatic collection tools may be relatively efficient at collecting information from the regular web, manual techniques may be needed in some use cases to collect leaked or stolen assets from the deep or dark web, which is not to suggest that purely automated approaches or any other technique is disclaimed.

The above noted techniques, alone or in combination, collect data from several sources. These sources include, but are not limited to (which is not to imply other lists are limiting), private sources, covert sources, active account takeover (ATO) combination lists, stolen assets, infected users, open sources, private forums, dark web markets, tor hidden services, and pastes. Once the data is collected, the data may be cleansed by putting the collected data through a rigorous quality-control process to determine the value of the collected data. After the data is cleansed, a database may be populated based on the cleaned data.

Figure 2:
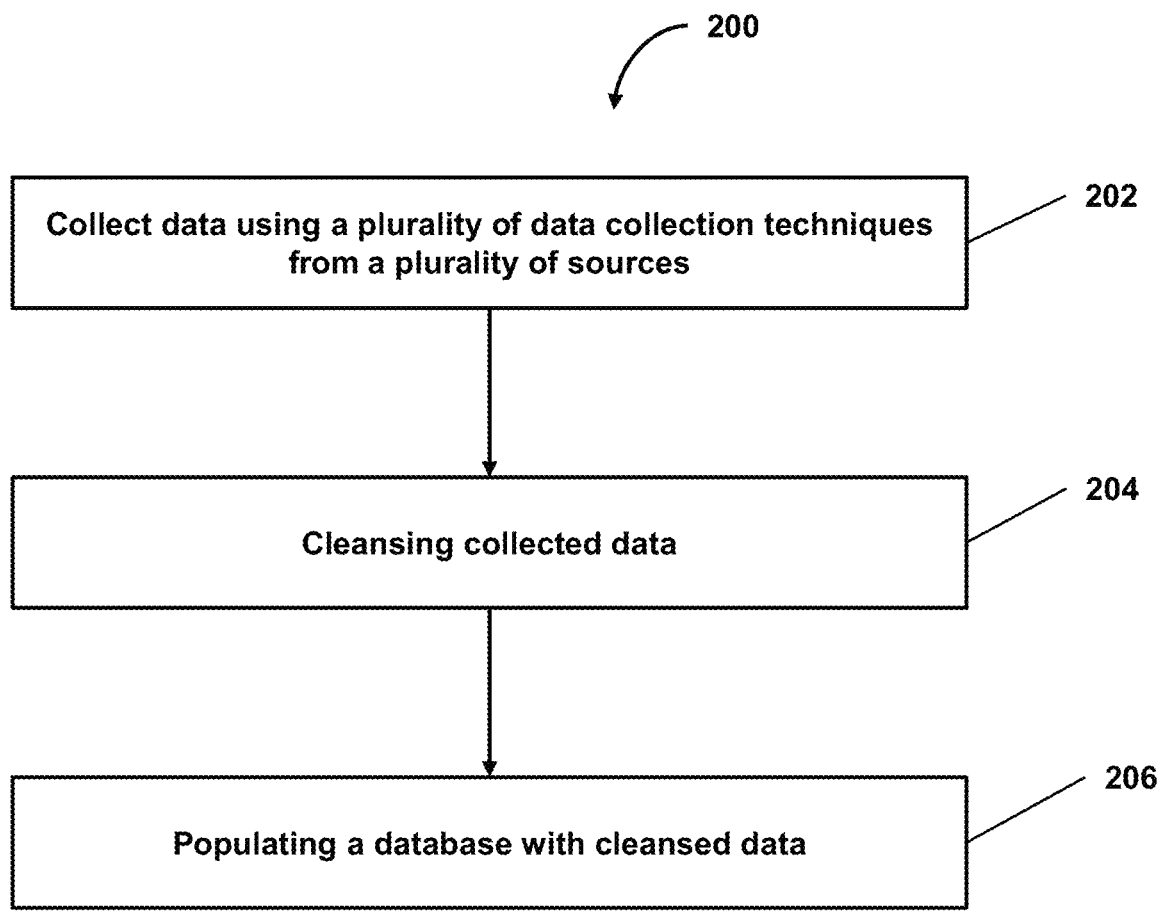
FIG. 2 is a flow chart that illustrates an example process of populating a database suitable for use in the system of FIG. 1A or 1B, in accordance with some embodiments of the present disclosure.

FIG. 2 illustrates an example process 200 of obtaining user information assets. The process 200, like the other processes described herein, may be implemented by executing instructions stored on a tangible, machine-readable medium with one or more processors, in some cases, with different processors executing different subsets of the instructions and with different physical memory or computing devices storing different subsets of the instructions. The processes (which includes the described functionality) herein may be executed in a different order from that depicted, operations may be added, operations may be omitted, operations may be executed serially, or operations may be executed concurrently, none of which is to suggest that any other description is limiting. In some embodiments, the processes herein may be implemented in one or more processors (e.g., a term which refers to physical computing components, like a central processing unit, a GPU, a field-programmable gate array, application-specific integrated circuits, and combinations thereof). The processing devices may include one or more devices executing some or all of the operations of the method in response to instructions stored on an electronic, magnetic, or optical storage medium.

In step 202, in some embodiments, data (for example, exposed or stolen data related to personally identifiable information) may be collected using a plurality of data collection techniques from a plurality of sources. In some examples, the data may include data stolen by malware or other malicious programs.

After the data is collected, in step 204, the collected data may be cleansed by putting the data through a rigorous quality-control process to determine the value of the collected data. The cleansing of the collected data may include several steps (examples of which are discussed in more detail below with reference to FIG. 3). The cleansing steps include parsing, normalizing, removing duplicates, validating, and enriching. Once the data is cleansed, in step 206, a database may be populated with the cleansed data. This data may then be used to efficiently retrieve user information assets associated with a user identification to determine user risk. The data may also be used to efficiently retrieve other compromised sensitive or confidential information related to the user.

Figure 3:
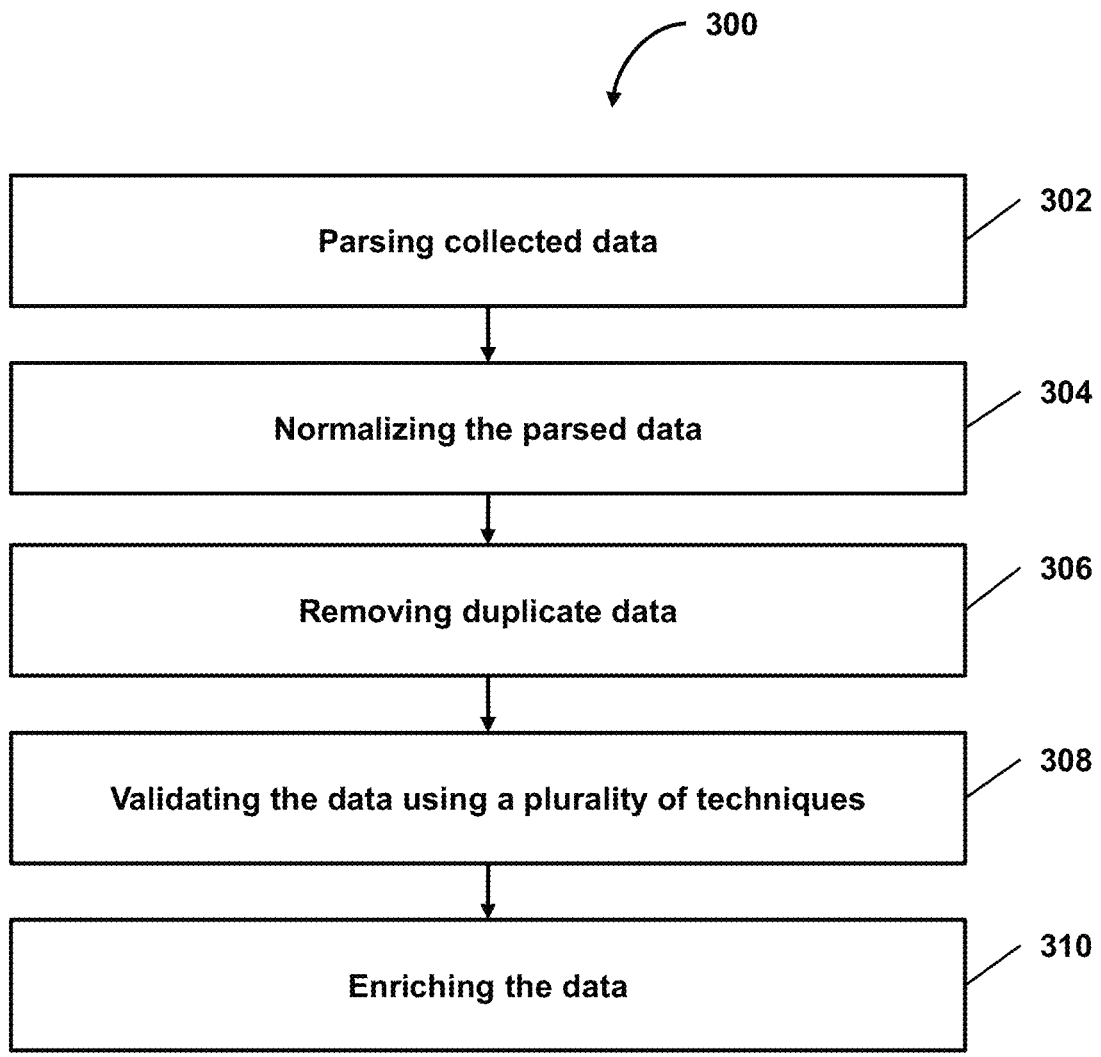
FIG. 3 is a flowchart describing an example of a process of cleansing collected data, in accordance with some embodiments of the present disclosure.

FIG. 3 illustrates an example process 300 of cleansing collected data described in step 204 in FIG. 2. In step 302, in some embodiments, the collected data is parsed and the parsed data is normalized in step 304. During the normalization process, in some embodiments, the data is parsed and classified into different fields (e.g., date of birth, username, password, domain name, identification (e.g., social security number, driver's license number, passport number, or the like), email, phone number, name, street address, or other fields that would be apparent to one of skill in the art in possession of the present disclosure). Also, during the normalization process (or during any step illustrated in FIG. 3), data that is not relevant may be deleted. For example, data records that do not include passwords or high value personal identification information may be discarded.

In step 306, duplicate data may be removed. During this step, in some embodiments, the normalized data may be compared to more than one or ten billion assets already stored in the database 132 (for example, the data collection database 134) or local database 142 (for example, the data collection database 144) and data that are duplicates may be discarded. In some cases, the above techniques configured to expedite pairwise matching of sets may be implemented to perform deduplication. Although duplicate data may be discarded, the database 132 or local database 142 may keep a record of a number of duplicates that were retrieved from unique sources.

In step 308, the data may be then validated using a plurality of techniques. Routines such as "validation rules," "validation constraints," or "check routines" may be used to validate the data so as to check for correctness and meaningfulness. The rules may be implemented through the automated facilities of a data dictionary, or by the inclusion of explicit application program validation logic.

Finally, in step 310, the data may be enriched so that the database 132 (for example, the data collection database 134) or local database 142 (for example, the data collection database 144) may be populated with, for example, how many times user credentials have been ingested from a unique source, the severity of each individual record, and additional metadata combined from different sources.

The populated database 132 (for example, the data collection database 134 or repository 238) or the local database 142 (for example, the data collection database 144) may take a number of forms, including in memory or persistent data structures, like ordered/unordered flat files, Indexed Sequential Access Method (ISAM), heap files, hash buckets, or B+ trees. In some embodiments, the data may be relatively frequently (e.g., more than once a week on average) collected, cleansed, and populated.

Retrieval of Data Associated with a User Identification Via an External Computer System for Identity Verification As noted above, identity verification is important to protect legitimate users of enterprise applications and enterprise computing assets themselves from malicious actors. Some of the present techniques afford efficient and proactive ways of retrieving user information assets (for example, exposed passwords) that are associated with a user identification, generating an identity risk score from the user information assets, and providing that identity risk score in response to an identity risk query so that a security action or inaction may be performed based on the identity risk score. FIG. 1A illustrates a system that facilitates efficient and proactive ways of retrieval of user information assets associated with a user identification and generation and notification of an identity risk score. In some embodiments, an enterprise may screen employees or customers before providing them access to a private network to determine whether they are inadvertently at risk of malicious activity or are a security threat themselves to the enterprise. In other embodiments, a user may be interacting with an enterprise application at an interaction point of a user interaction cycle. For example, the interaction point may include user account creation, user account access, user account change, a sensitive transaction, or any other interaction point that may be apparent to one of skill in the art in possession of the present disclosure. In a specific example, a user may request to access a user account using a user credential (for example, a user identification (such as a username) and a password associated with the user identification) via a client device 104. The request may be sent to the local server 152 via network 150 and received by the local server 152 via the communication subsystem 164. Alternatively, in some embodiments, the request to access the user account may be sent to the local server 152 via an internal network (not shown) that connects the client device 104 and the local server 152. In response to the received request, the communication subsystem 164 may forward the request to a client authentication subsystem 168. The client authentication subsystem 168 may determine whether to grant access to the user (for accessing the account) based on the user identification and password combination received from the client device 104.

In some embodiments, in response to receiving the user credentials from the client device 104, the client authentication subsystem 168 may compare the received user credential with stored user credentials (for example, stored in the local miscellaneous database 146). If the received user credential matches one or more user credentials stored in the local miscellaneous database 146, the client authentication subsystem 168 grants access to the user to access the user account via the communication subsystem 164. Furthermore, the client authentication subsystem 168 may request a determination of risk from the risk engine 220. The risk engine 220 may query the application program interface server 234 such that the identity risk-generation system 212 of FIG. 1B or the monitoring system of FIG. 1A generates an identity risk score as discussed below and returns the identity risk score to the risk engine 220. If the identity risk score satisfies and internal level of risk for user authentication, then the risk engine 220 may provide to the client authentication subsystem 168 notification of the lack of risk. Accordingly, the user of the client device 104 is allowed to access the user account to which he/she has been granted access. If the identity risk score does not satisfy the internal level of risk for user authentication, then the risk engine 220 may provide to the client authentication subsystem 168

In some embodiments, the local server 152 may be any server that authenticates any user account. For example, in some embodiments, the local server 152 may be a server associated with a website or a company, and the local server 152 may grant access to the website or information within the company's network when the user credentials match stored user credentials. In this example, the client device 104 may be a customer that seeks to access a website using the customer's user credentials or may be an employee of a company that seeks to access information within a company's network. In some embodiments, the server 102 may be a third-party server that offers services of providing data (for example, exposed or stolen user credentials, a risk assessment, or the like) associated with, for example, a user account to prevent account take over (e.g., prevent hacking) of the user account.

In some embodiments, once the local server 152 grants access to the user of the client device 104 to access a user account or before granting access, the client device 104 or the local server 152 (via the communication subsystem 164) may automatically generate an identity risk query and send the identity risk query, via the network 150, to the server 102 in order to receive an identity risk score associated with the user identification. However, in other embodiments, an enterprise administrator may perform a manual identity risk query via a user interface where the enterprise administrator enters a user identifier such as a phone number or email address and generates an identity risk API query with the application program interface server 234. The identity risk query may identify a user identification (for example, that was entered by the user of the client device 104 to access a user account). The query may also identify other information related to the user identification and the user, for example, location of access by the user (e.g., IP address) and date and time of access by the user. The identity risk query may be obtained by the server 102 via SSL (Secure Sockets Layer), TLS (Transport Layer Security), or various other protocols. In some embodiments, an identity risk query does not necessarily have to be sent to the server 102 in response to the user logging (or attempting to login) into a user account using the user credentials. The identity risk query may be sent to the server 102 at another time and may identify a plurality of user identifications associated with a plurality of users and user accounts. For example, the local server 152 (or a client device 104 acting as an administrator) may request retrieval of an identity risk score for a plurality of users. Accordingly, the local server 152 (or client device 104) may generate a query that identifies a plurality of user identifications and send the query to the server 102 (for example, via network 150) in order to retrieve identity risk scores associated with the plurality of user identifications (which may be associated with one or more user accounts). The identity risk query may include a request for identity risk directed to the API 112 in the server 102. In some embodiments, the query (for example, identifying one or more user identifications or other data associated with the one or more user identifications) may be automatically generated at a predetermined time set by the local server 152 or client device 104 (for example, an administrator).

In some embodiments, the identity risk query may be received by the server 102 (for example, via the communication subsystem 114) and may be routed to the API 112. In response to the identity risk query, the API 112 may generate a search query configured to retrieve data related to the user identification (which may be identified in the query) from the database 132 (for example, data collection database 134). Prior to sending the search query, the server 102 may determine one or more criteria for the search query to make the search process more efficient. The search query may be an SQL (Structured Query Language), an MDX (Multidimensional Expressions) query, or the like.

In some embodiments, one or more criteria for the search query may be generated by the server 102 based on various factors. For example, a criterion of the search query (e.g., a value of a field in a where clause) may be determined based on whether another search query identifying the same user identification has been previously obtained. In other words, the server 102 (for example, the monitoring subsystem 116) may determine whether the user identification (that is received in the current query) has also been previously obtained in one or more previous queries. Whenever a search query identifying a user identification is obtained, the server 102 may keep a record (for example, metadata related to the query) of such a search query in its miscellaneous database 136. Such a record may include a date and time of the obtained search query, a location (for example, IP address) from where the search query is received, a user identification identified in the obtained search query, or various other data related to the user identification and the obtained search query.

In some embodiments, in response to receiving an identity risk query identifying the user identification, the server 102 may retrieve data (e.g., metadata), via the API 112, from the miscellaneous database 136, associated with one or more user identification entries in the miscellaneous database 136 that matches the user identification in the received identity risk query. In other words, the server 102 may retrieve (for example, from the miscellaneous database 136), via the API 112, other information related to the previously obtained identity risk query when (e.g., in response to an event in which) the user identification in the current identity risk query matches one or more user identifications stored in the miscellaneous database 136. For instance, the server 102 may retrieve a previous date and time the user identification was obtained in the previous identity risk query and use this date and time to generate a search criterion for the search query. When it is determined that the user identification has been previously obtained in another identity risk query or search query, the search for data related to the user identification from the database 132 (for example, the data collection database 134) may be limited to, for example, data that has been populated on or after the date (or time) the user identification was previously obtained in the other search query. In some embodiments, when (e.g., in response to an event in which) the server 102 (via, for example, the monitoring subsystem 116) determines that another query identifying the same user identification (which was identified in the current search query) has been previously obtained, the server 102 may generate a search criterion such that data (related to the user identification) that is retrieved from the database 132 (for example, data collection database 134) corresponds to data that was populated into the database 132 (for example, data collection database 134) on or after a date or time of the previously obtained search query. In this example, data collection database 134 may include the data collected, cleansed, and populated, as described above with regard to FIGS. 2 and 3, and miscellaneous database 136 may include other miscellaneous data (for example, information regarding time and date of a received search query, a location of a received search query, etc.) related to user identifications.

In some embodiments, once the search query and the search criterion are generated, data associated with one or more user identification entries in the data collection database 134 that matches the user identification identified in the current search query is retrieved, via the API 112, from the database 132 (for example, data collection database 134) based on the search query and the criteria for the search query. In some embodiments, when (e.g., in response to an event in which) it is determined that the identity risk score has not been previously identified in a previous search query, the search criterion may cause embodiments to require the entire data collection database 134 to be searched in order to retrieve data (for example, one or more passwords) associated with one or more user identification entries in the database that matches the user identification identified in the current search query. On the other hand, when (e.g., in response to an event in which) it is determined that the identity risk score has been previously identified in a previous search query, the search criterion may cause embodiments to require only a portion of the data collection database 134 (the portion that includes data populated on or after the date or time the previous query was obtained) to be searched in order to retrieve data (for example, one or more passwords) associated with one or more user identification entries in the database that matches the user identification identified in the current search query. Accordingly, server 102 may retrieve, via the API 112, from a portion of the data collection database 134, data (for example, one or more passwords) associated with one or more user identification entries in the data collection database 134 that match the user identification identified in the current search query. The database 132 may be indexed in such a manner that data populated in the data collection database 134 at different times can be easily distinguished during a search process. In some embodiments, the data retrieved from the data collection database 134 may include metadata associated with the one or more passwords retrieved from the data collection database 134. Such metadata may include a date of exposure of the one or more passwords, a number of exposures of the one or more passwords, or a location of exposure of the one or more passwords.

This makes the data retrieval process more efficient relative to simpler data access techniques. Allowing the search to be performed on only a portion (or subset) of a database decreases the time taken to retrieve data associated with the user identification, reduces the use of computer resources of, for example, the server 102, and provides the retrieved data to a recipient sooner so that the recipient may act on such data in a quicker manner, thereby preventing account takeover sooner than later. In other words, in some embodiments, the entire database may not need be searched and only a portion (or subset) of the database may need to be searched to retrieve data related to the user identifications, none of which is to suggest that simpler data access techniques or any other subject matter are disclaimed.

To make the data retrieval process more efficient relative to simpler data access techniques, the monitoring subsystem 116 may perform a plurality of parallel search queries of the data collection database 134 based on the single identity risk API query. The parallel search queries may include lambda functions in a cloud computing environment. The parallel search queries may reduce latency when retrieving data from the data collection database 134 or the miscellaneous database 136 that include 10's of millions, 100's of millions, billions, or 10's of billons or greater than 100's of billions user information assets return the result in 500 msec.-800 msec. By using Lambda functions we essentially implement a distributed processing mechanism, akin to Map-Reduce. During processing time we build a list of subqueries that have to execute and then run them all in parallel, as we continue to build a result tree until we reach a max tree depth. For instance, if a user queries for "alen@spycloud.com" the query code will first query for all available assets matching that email address and then proceed to execute multiple subqueries, in parallel, against all related assets until we've built a large enough data set to satisfy our query requirements. In certain cases this results in hundreds of subqueries. When executed in parallel we drastically reduce the runtime of the Lambda function so that we can execute many subqueries (which each take 10 ms) in a very short amount of time (500-800 ms) thanks to parallelization.

By using Lambda functions, the monitoring subsystem 116 essentially implements a distributed processing mechanism, akin to Map-Reduce. During processing time, the monitoring subsystem 116 builds a list of subqueries that have to execute and then run them all in parallel, as the monitoring subsystem 116 builds a result tree until a max tree depth is reached. For instance, if a user queries for "user1@spycloud.com" the query code will first query for all available assets matching that email address and then proceed to execute multiple subqueries, in parallel, against all related assets until monitoring subsystem 116 has built a large enough data set to satisfy a query requirements. In certain cases, this results in hundreds of subqueries. When executed in parallel, those subqueries drastically reduce the runtime of the Lambda function so that many subqueries are executed (which each take 10 ms) in a very short amount of time (500-800 ms) thanks to parallelization.

In some embodiments, prior to performing the search query or subsequent to performing the search query with the user identification. An identification query may be performed to determine other user identification. For example, a work email used to determine risk for an employee may provide limited information as the digital fingerprint of that work email may not provide much captured information in the databases 132. As such, by determining whether there are other user identifications associated with a user such as personal emails, a greater number of user information assets may be discovered for the user. Specifically, if the user has a relatively low identity risk score associated with that user's work email, by identifying other user identifications and performing a search query on those identifications may uncover that a user's personal computer at home is infected with malware which may jeopardize that employer's enterprise system when that user logs into the private network remotely from the personal computer. As such, multiple search queries may be performed based on the initial identity risk API query for each user identification that determined by the identification query.

In some embodiments, the data retrieved from the data collection database 136 may include, for example, user information assets associated with the user identification such as the user information assets discussed above. The monitoring subsystem 116 may analyze the retrieved user information assets. To determine risk, the monitoring subsystem 116 may analyze passwords (e.g., plaintext, non-plaintext passwords), usernames, email addresses, phone numbers, street addresses, malware captures, security questions and answers, dates associated with user information events (e.g., date of malware breach), names, social security numbers, date of birth, or other user information assets associated with a user identification that would be apparent to one of skill in the art in possession of the present disclosure.

In some embodiments, the monitoring subsystem 116 may use, for example, rainbow tables for cracking the non-plaintext passwords. Compromised credentials in encrypted or hashed form may be cracked in advance of search queries against these credentials, e.g., before matching the results to credentials being tested, in order to expedite operations, as password cracking is often a relatively computationally expensive operation. Rainbow tables are large sets of pre-computed tables filled with hash values that are pre-matched to possible plaintext passwords. The rainbow tables may be stored in the miscellaneous database 136. In some embodiments, the monitoring subsystem 116 may perform brute-force attacks (e.g., of iteratively guessing every possible combination of a password) or dictionary attacks (e.g., by loading a password cracking dictionary containing hundreds of thousands of commonly used passwords and see if it gets any hits) in order to crack the non-plaintext passwords.

The retrieved user information assets from the data collection database 134 may be temporarily stored in the miscellaneous database 136 along with the user identification. Temporarily storing the retrieved user information assets associated with the user identification in the miscellaneous database 136 may allow retrieval of such data in view of a subsequent identity risk query (identifying the user credential) received from the local server 152 or another server (not shown). Such temporary storage may be helpful to retrieve user information assets quickly from miscellaneous database 136 (compared to retrieving the user information assets from the data collection database 134, which may take more time) when subsequent one or more identity risk queries (identifying the same user credential) is obtained from one or more sources within a predetermined amount of time. In some cases, it may be quicker to retrieve user information assets associated with the user identification from the miscellaneous database 136 (which may be smaller than the data collection database 134). Retrieving the user information assets associated with the user identification from miscellaneous database 136 may use fewer computer resources (compared to retrieving the user information assets associated with the user identification from the data collection database 134) of the server 102. Further, retrieving the user information assets associated with the user identification from miscellaneous database 136 may result in providing the retrieved user information assets or an identity risk score generated from the retrieved user information assets to a recipient (for example, the local server 152 or any other external computer system) sooner so that the recipient may act on such user information assets in a quicker manner, thereby preventing account takeover sooner than later.

In some embodiments, the retrieved data may include metadata associated with the one or more retrieved user information assets. Such metadata may include a date and time of exposure of the one or more passwords, a number of exposures of the one or more passwords, or a location of exposure of the one or more passwords, a date and time of a malware breach, or date and time associated with other user information assets. The date and time of exposure of the user information assets may correspond to the date and time at which the one or more passwords were collected during the collection of data using a plurality of data collection techniques from a plurality of sources in step 202 of FIG. 2. During the step of collecting data in step 202 of FIG. 2, the collected data may be correlated with a date and time of collection of the data. In some embodiments, the date and time of exposure of the user information assets may correspond to the date and time at which the user information assets were exposed within the source.

In some embodiments, the retrieved data may include a number of exposures of the user information assets. For example, the same user information assets associated with a user identification may be exposed within a plurality of sources. Accordingly, a record might be kept in the data collection database 134 regarding a number of exposures of the same user information asset. In other words, the data collection database 134 may keep a record of a number of sources from which the same user information asset (associated with the user identification) was collected during the data collection and data cleansing steps illustrated in FIGS. 2 and 3. Further, in some embodiments, the retrieved data may include a location of exposure of the one or more passwords. During the data collection step 202, a record may be kept of the location from which the data is collected. For example, a user information asset associated with a user identification may have been exposed on the dark web or a blog post, and such information regarding the location of the exposure may be collected during the data collection step 202 in FIG. 2 and may be retrieved in response to a search query identifying the user identification. Such retrieved data may be sent to the local server 152 (i.e., received by the local server 152) in response to a query identifying the user identification. It should be understood that all or a portion the data retrieved by the server 102 may be sent to the local server 152. In some embodiments, the data may be sent to the local server 152 with the identity risk score.

In some embodiments, the retrieved passwords described above may be strings of alpha numeric characters. Further, in some embodiments, the retrieved passwords may be biometric attributes, like facial recognition data, fingerprint data, or various other types of data that allow access to a user account. The user identification may be various forms of identification used to access a user account. In some embodiments, the user identification may include a username or a username and a domain name (for example, john.smith@gmail.com). Further, in some embodiments, the user identification may be strings alpha numeric characters or may be various form of identification that uniquely identifies a user within a system's username space.

Once the user information assets are received, the monitoring subsystem 116 may generate an identity risk score. For example, the monitoring subsystem 116 may compile and process the user information assets to determine a number of identity risk factors that are used to generate the identity risk score. For example, the monitoring subsystem 116 may determine a number of days since last email and plaintext password exposure, whether only an email was detected, number of unique emails, whether or not there is any email history (lack of email history may indicate a person coming of age that does not otherwise have a digital footprint or a party that is creating a new identity for the purposes of malicious activities), a password reuse percentage, whether malware is detected from the user information assets, number of days since breach of user information on a third party system, combo list days (e.g., a text file that includes a list of leaked usernames and passwords in a specific format where the passwords are usually obtained from different breaches and collectively stored in a file), a number of unique phone numbers, a number of unique last names, a name match (e.g., match of a user's name to a name in a breach), a number of unique street addresses, a number of unique postal codes, a number of date of births, a social security number exposed, or any other identity risk factors that may be apparent to one of skill in the art in possession of the present disclosure. In other embodiments, to assess risk, the monitoring subsystem 116 could assess cookies, browser, history, installed apps, or passkeys. Once individual identity risk factors are determined, comparisons of the values of the identity risk factors to respective identity risk factor conditions may be performed. Based on the identity risk factor conditions, individual identity risk scores for each identity risk factor may be determined. Each of the identity risk factors may be associated with a weight such that certain identity risk factors are considered to have greater weight in determining an identity risk score than another identity risk factors. For example, malware detection for one user that had a third-party breach 75 days ago may have a higher score than if there was a $3^{rd}$ party breach of another user's information 19 days ago. The identity risk scores for each identity risk factor may be aggregated or compiled based on the individual identity risk scores into the identity risk score. The identity risk factors that particularly contributed to a low-identity risk score or a high-identity risk score may be identified and included in an identity risk score response to the identity risk query. The identity risk score may include a value or may include general identity risk score identifier of high-risk, low risk, medium risk, or any other general risk identifier that would be apparent to one of skill in the art in possession of the present disclosure While particular examples of calculating an identity risk score are discussed, one of skill in the art in possession of the present disclosure may recognize that the identity risk score calculation can be performed in variety of ways and may be customized to a particular enterprise or group of enterprises.

Notification of Identity Risk Score to Perform Security Action

As discussed above, server 102 or local server 152 may generate an identity risk score response that may include an identity risk score and, in some embodiments, factors that contributed to the identity risk score or other data (e.g., user asset information) returned in the search query. The identity risk score may be retrieved in response to risk determination condition being satisfied. For example, in response to a user attempting to login (for example, via client device 104) using the user identification and password combination, completing a transaction, changing a user account, initiating a user account, in response to a request of an administrator (for example, client device 104), or may be retrieved at any time or based on any condition in the enterprise computing system that would benefit from a risk assessment that would be apparent to one of skill in the art in possession of the present disclosure.

In some embodiments, when the identity risk score response is generated by the server 102, the server 102 may send the retrieved the identity risk score response to the local server 152 via network 150. Alternatively, in some embodiments, the identity risk score associated with the user identification may be retrieved by the local server 152 or provided to the local server 152 in response to an identity risk query to the API 112. The identity risk score response may include the identity risk score and factors that contributed to the determination. Although the techniques below may be described to be performed by the local server 152, it should be understood that such techniques can be performed by server 102. In some embodiments, the identity risk score response may include the individual identity risk scores for the various identity risk factors.

Once the identity risk score response is received, the risk engine 220 or the monitoring subsystem 166 may determine whether to perform a security action or not. The security action may be based on the identity risk score satisfying a security risk condition. In some embodiments, the security action may also be based on a combination of the interaction point and the identity risk score satisfying a security risk condition. In some embodiments, the identity risk factors, or other risk assessments performed by the risk engine 220 or the monitoring subsystem 116, may also contribute to determine whether the security risk condition is satisfied and the security action to perform and, in some embodiments, determine a set of security actions of a plurality of security actions to perform. If the security risk condition is not satisfied, the risk engine 220 or the monitoring subsystem 116 may proceed with the user interaction cycle as intended by completing the interaction point and proceeding to the next interaction point of the user interaction cycle. If the security risk condition is satisfied, a security action may be performed that either prohibits the user form continuing with the user interaction cycle or requires an additional interaction point (e.g., further authentication (e.g., multi-factor authentication) before proceeding with the user interaction cycle as intended in low-risk conditions. For example, the server 152 may determine to block access to the user account associated with the user identification that was used to query the API 112. By blocking access to the user account in response to determining high risk, the present techniques are expected to help prevent account take over or other security threats by malicious actors.

In some embodiments, a user may be currently accessing the user account when it is determined that the identity risk score satisfies the security condition. In such an instance, the local server 152 may notify the user of the user account that the user account has been exposed, that the functionalities (certain essential functionalities of the user account) of the user account may be disabled within a predetermined amount of time, to reset the password for the user account immediately, to change the security questions and answers associated with the user account, or other security actions. As noted above, certain functionalities of the account may be disabled by the local server 152, thereby, forcing the user of the user account to take immediate action in resetting the password of the user account or changing the security questions and answers. Further, in some embodiments, the local server 152 may also automatically log out the user from the user account after a certain period of time if the user has not reset the password for the user account or changed the security questions and answers. After automatically logging the user out of the user account, the local server 152 may block access to the user account until the password of the user account has been reset or the security questions and answers associated with the user account have been changed.

In some embodiments, a user of the user account may not be currently accessing the user account or is in a user interaction cycle when it is determined that the identity risk score satisfies a security interaction condition. In such an instance, the local server 152 may block access to the user account whenever the user of the user account attempts to access the user account and during the attempt to access the user account or some other security action that would be apparent to one of skill in the art in possession of the present disclosure. In any of the examples, the security action may also alert an administrator that is either checking risk of users manually or that receives security risk notifications from the risk engine 220 or monitoring subsystem 116. Such a notification may be via email, text, phone call, or any form of communication to notify the user or administrator of the user account to set up other safeguards to limit security risk. In some embodiments, the notification may be sent to the user via a means different from the user identification that was used to assess risk in the query. For example, if the user identification john.smith@gmail.com is used to assess risk, then the local server 152 may notify the user of the potential risk to the user account via a different user identification (for example, a different email associated with the user of the user account) or via a different means of communication (for example, text, phone call, etc.). The different user identification or information regarding a different means of communication may be stored within and obtained from the local miscellaneous database 146. By notifying a user of the user account via a different user identification or via a different means of communication, the present techniques are expected to avoid the possibility of a third party (for example, a criminal party) being able to complete an additional security interaction point before the user of the user account is able to. Accordingly, some embodiments may notify the user of a user account of a security risk via a different user identification or via a different means of communication to prevent account takeover.

In some embodiments, the local server 152 may classify such a user account as a high-risk user account (or the user as a high-risk user). In some embodiments, if the user account has been classified as a high-risk user account, then the user of the user account may be required to perform a two-factor authentication prior to being granted access to the user account. In other words, the user of the user account may now need to provide a password and another form of authentication in order to be able to access the user account. In some embodiments, if the user account has been classified as a high-risk user account, then the user may be required to change one or more of the user identification, the password, and the security questions and answers associated with the user account in order to access the user account.

Figure 4:
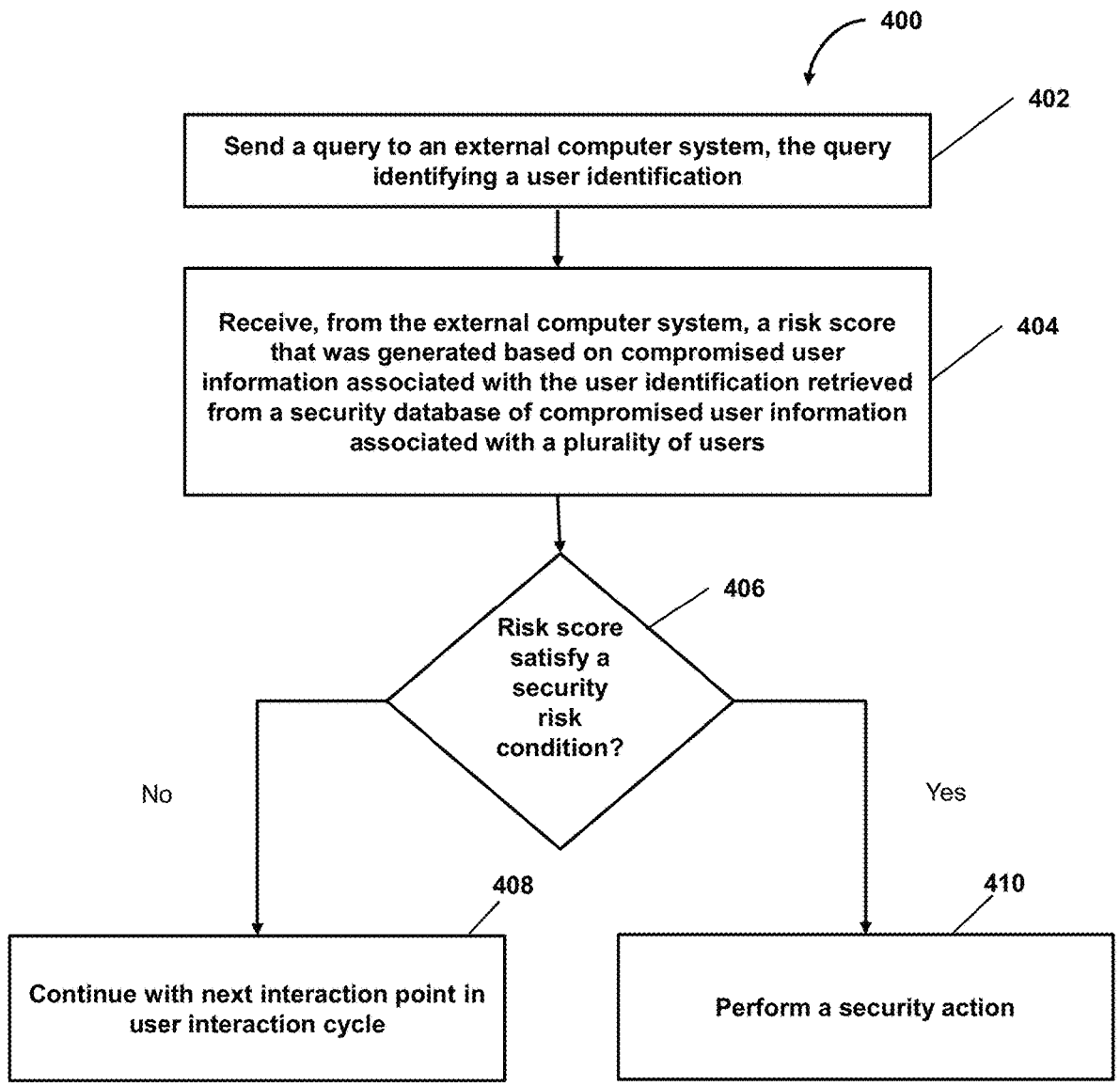
FIG. 4 is a flowchart of an example process that facilitates prevention of account takeover by receiving an identity risk score from an external computer system, in accordance with some embodiments of the present disclosure.

FIG. 4 illustrates an example process 400 that impedes security threats to enterprise computing resources by receiving an identity risk score associated with a user identification from an external computer system. In step 402, an identity risk query identifying a user identification may be sent to an external computer system. In addition to identification, the identity risk query may also identify other information related to the user identification and a user, for example, location of access by the user (e.g., IP address) and date and time of access by the user. In response to the identity risk query, the external communication system may retrieve, via an application programming interface, an identity risk score response from the external computer system that may include an identity risk score and, in some embodiments, identity risk score factors that were major factors in determining the identity risk score (see step 404 in FIG. 4). In some embodiments, the external computer system may obtain, from a database, user information assets associated with one or more user identification entries in the database that matches the user identification or using other user identifications that are mapped to the user identification provided in the identity risk query. The retrieved user information assets may also include metadata associated with the user information assets. For example, the retrieved user information assets may include date and time metadata associated with the user information assets, or a location of exposure of the user information assets. All of the retrieved user information assets may be received by the external computer system. The process of retrieving the user information assets from the database is described above. Accordingly, for the sake of brevity, the process of retrieving the user information assets is not repeated. The external computer system may determine the identity risk score based on the user information assets and provide the identity risk score response that may include an identity risk score and, in some embodiments, identity risk score factors that were major factors in determining the identity risk score.

In decision step 406, in some embodiments, a determination as to whether the identity risk score satisfies a security risk condition is made. In some cases, an identity risk score may be used to determine whether to perform a security action for a user that is associated with the user identification in step 410 or to continue with a user interaction cycle uninterrupted in step 408. The determination may be based on the identity risk score but also based on additional risk assessments, identity risk score factors that were used to determine the identity risk score, or any number of factors.

In step 408, in some embodiments, when the identity risk score does not satisfy the security risk condition, the user may continue with the next interaction point in a user interaction cycle that includes a plurality of sequential user interaction cycle points and the user interaction cycle is with an application or enterprise system. For example, when it is determined that user has a low-risk, a user attempting to access a user account may be granted access when presenting correct user authentication credentials.

If at step 406, the identity risk score satisfies the security risk condition, the process 400 may proceed to step 410, where a security action is performed. For example, a security action may include blocking a user's access from a user account, blocking edits to a user account, blocking user account initiation, notifying an administrator of a high-risk user, notifying the user that they are considered high-risk and actions that could be performed to reduce the risk (e.g., remove malware), changing a username or password, requiring additional security interaction points in a user interaction cycle to prevent account takeover, prevent a transaction from occurring, or any other security action that is discussed herein or that would be apparent to one of skill in the art in possession of the present disclosure. By performing a security action, the present techniques help prevent account take over by third parties, protect guest checkout, protect against synthetic identity or other security risks, thereby preventing financial losses and losses relating to confidential information.

In step 410, in some embodiments, a user associated with the user account may be notified to reset the password when the one or more passwords matches the password associated with the user identification. Such a notification may be via email, text, phone call, or any form of communication to notify the user of the user account to reset the password associated with the user account to prevent account takeover. In some embodiments, the user of the user account may also be notified to change the security questions and answers associated with the user account when the received security questions and answers match the security questions and answers associated with the user account. In some embodiments, the notification may be via a means different from the user identification (which is used to access the user account). For example, if the user identification john.smith@gmail.com is used to access a user account and the password associated with this user account matches the one or more passwords, then the user may be notified of the potential breach of the user account to reset the password via a different user identification (for example, a different email associated with the user of the user account) or via a different means of communication (for example, text, phone call, etc.). By notifying a user of the user account via a different user identification or via a different means of communication, the present techniques avoid the possibility of a third party (for example, a criminal party) being able to reset the password or change the security questions and answers before the user of the user account is able to. Accordingly, embodiments may notify the user of the user account that the password or security questions and answers have been exposed via a different user identification or via a different means of communication to prevent account takeover.

In addition to requesting and notifying the user to reset the password associated with the user account and that the password (and user identification) associated with the user account has been exposed, the user may also be notified of metadata associated with the one or more passwords that matches the password associated with the user account. The metadata may include a number of exposures associated with the one or more passwords, a date and time of exposure of the each of the number of times the password has been exposed, or a location of exposure of the one or more passwords. In other words, in some embodiments, the user of the user account may be provided with additional details regarding the exposed password. For instance, the user may be notified of a number of times the password associated with the user account has been exposed, a date and time of exposure of the each of the number of times the password has been exposed, or a location (or locations) of exposure of the password. The data and time of exposure of the password may provide the user with valuable information. The date and time of the exposure may allow the user to recollect the user's previous use of the user account on a particular day and time, which may help the user determine the cause of exposure of the password and user identification associated with the user account.

Figure 5:
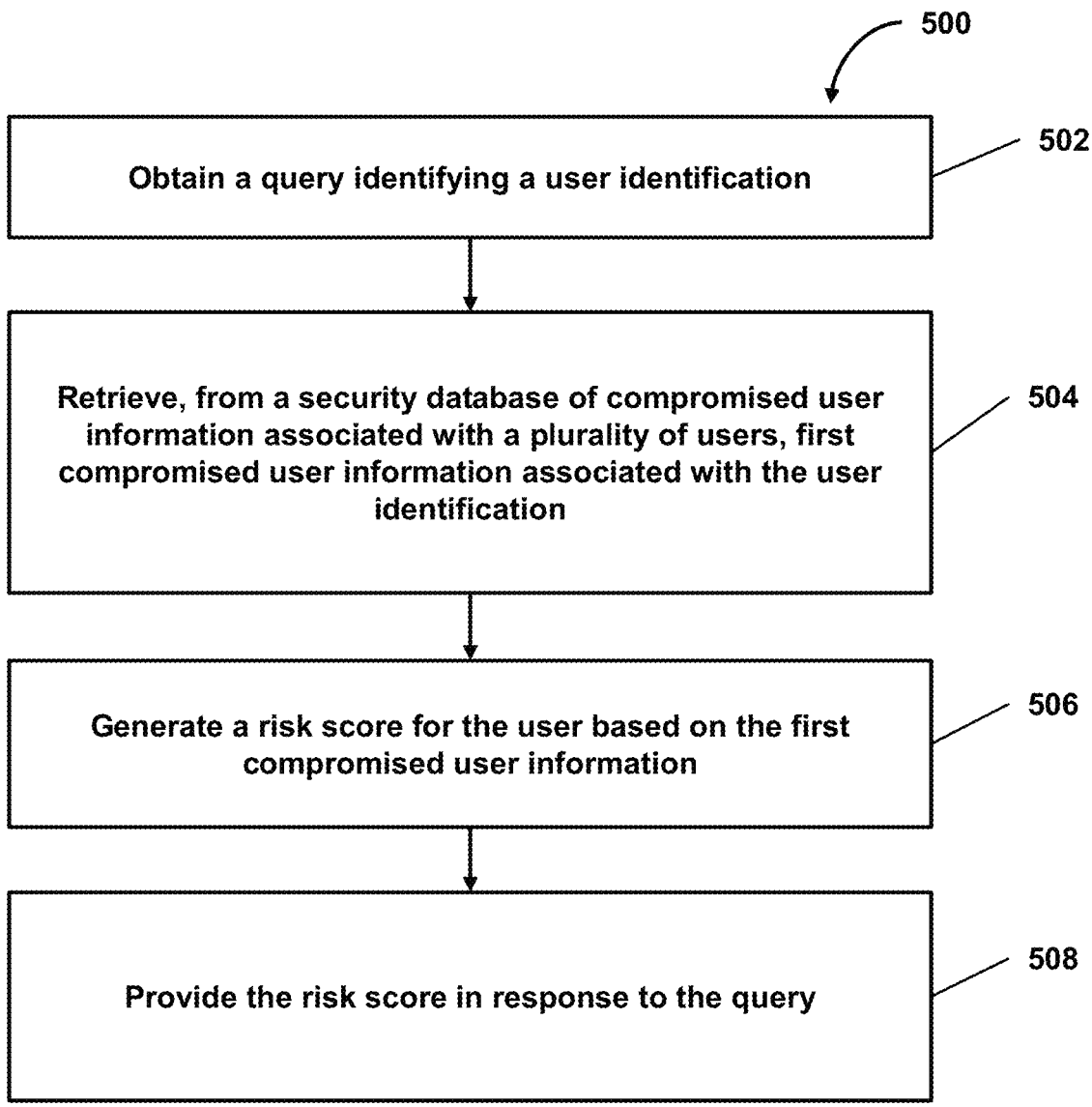
FIG. 5 is a flowchart of an example process that facilitates prevention of account takeover by generating an identity risk score, in accordance with some embodiments of the present disclosure.

FIG. 5 illustrates an example process 500 that impedes security threats to enterprise computing resources and applications by generating an identity risk score associated with a user identification from an enterprise computer system. In step 502, an identity risk query identifying a user identification may be obtained from an enterprise computer system. In addition to identification, the identity risk query may also identify other information related to the user identification and a user, for example, location of access by the user (e.g., IP address) and date and time of access by the user. In response to the identity risk query, the computer system may retrieve, at step 504 and from a database, user information assets associated with one or more user identification entries in the database that matches the user identification or using other user identifications that are mapped to the user identification provided in the identity risk. The retrieved user information assets may also include metadata associated with the user information assets. For example, the retrieved user information assets may include date and time metadata associated with the user information assets, or a location of exposure of the user information assets. All of the retrieved user information assets may be received by the computer system. The process of retrieving the user information assets from the database is described above. Accordingly, for the sake of brevity, the process of retrieving the user information assets is not repeated. At step 506, the external computer system may determine the identity risk score based on the user information assets and provide, at step 508, an identity risk score response that may include an identity risk score and, in some embodiments, identity risk score factors that were major factors in determining the identity risk score to the enterprise computer system that made the query.

Figure 6:
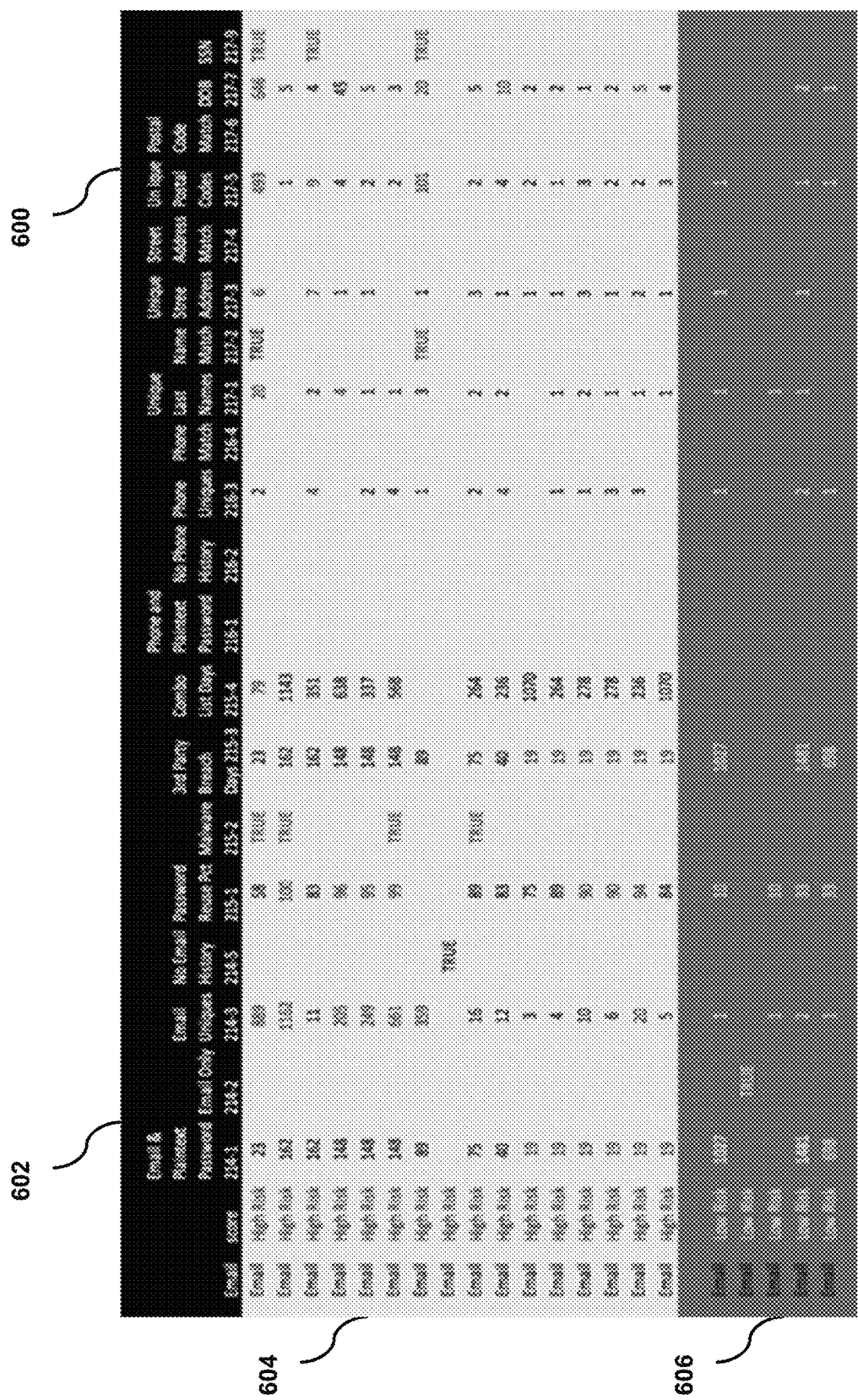
FIG. 6 is an example identity risk score table, in accordance with some embodiments of the present disclosure.

FIG. 6 illustrates an identity risk score table 600 generated for various user identifications according to embodiments of the present disclosure discussed herein. As illustrated by the identity risk score table 600, an e-mail may be the user identification and that user identification may be associated with a plurality of identity risk factors and a determined identity risk score (e.g., high-risk or low-risk). For example, there is a high-risk group 604 and a low-risk group 606. The users included in the high-risk group 604 may be included because of one or more identity risk factors satisfy a respective identity risk factor condition. For example, some users may be determined high risk because, there is no email history detected from the user information assets, a recency of a email and plaintext password exposure being too recent, the number of unique emails associated with the user being too many, high password reuse percentage, whether malware generated files were detected in the user information assets, a recency of a $3^{rd}$ party data breach occurring recently, combo list days being low in number, the number of phone numbers, names, addresses, postal codes, or date of births being high, when a social security number of the user is available in the user information assets or based on other identity risk factors listed in the identity risk score table 600 or that could be included in the identity risk score table 600 that would be apparent to one of skill in the art in possession of the present disclosure. When referring to high l or low, a threshold condition may be considered such that anything that is above or at the threshold condition is high and anything below or at the threshold condition being considered low. The users included in the low-risk group 606 may be included in the low-risk group 606 because of similar identity risk factor conditions may not satisfy the respective identity risk factor condition (e.g., a low number of emails, phone numbers, last names, street addresses, postal codes, or phone numbers associated with a particular user; low password reuse percentage, no malware or social security number detections; breaches or exposures that are further out in time; or based on other identity risk factors.

Thus, systems and methods of the present disclosure provide an efficient process for determining risk of a user using an application or enterprise computing resources by obtaining information from large databases of available user information assets on the Internet, determining an identity risk score, and providing that identity risk score to the enterprise system to make a security action determination. Using parallel queries across a database that has more than 10 million user information assets, the systems and the methods of the present disclosure can return real-time (e.g., 500 msec-1000 msec) identity risk scores such that quick intervention of security threats may be detected and eliminated by the enterprise system.

Figure 7:
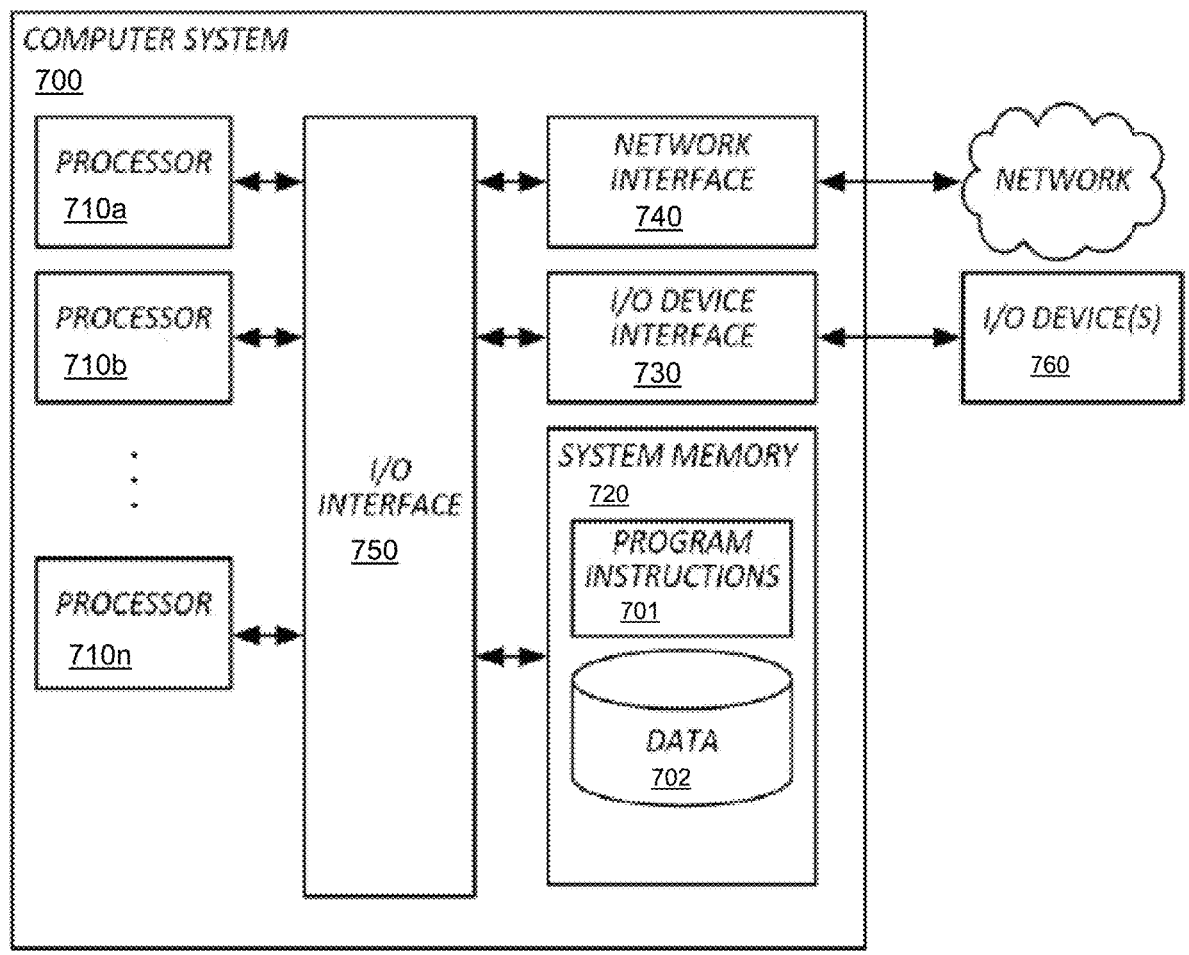
FIG. 7 is an example of a computing device by which the above techniques may be implemented, in accordance with some embodiments of the present disclosure.

FIG. 7 is a diagram that illustrates an exemplary computing device 700 in accordance with embodiments of the present technique. Various portions of systems and methods described herein, may include or be executed on one or more computer systems similar to computing device 700. Further, processes and modules described herein may be executed by one or more processing systems similar to that of computing device 700.

Computing device 700 may include one or more processors (e.g., processors 710a-710n) coupled to system memory 720, an input/output I/O device interface 730, and a network interface 740 via an input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing device 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing device 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing device 700 may include a plurality of computing devices (e.g., distributed computer systems) to implement various processing functions.

I/O device interface 730 may provide an interface for connection of one or more I/O devices 760 to computing device 700. I/O devices may include devices that receive input (e.g., from a user) or output information (e.g., to a user). I/O devices 760 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computing device 700 through a wired or wireless connection. I/O devices 760 may be connected to computing device 700 from a remote location. I/O devices 760 located on remote computer system, for example, may be connected to computing device 700 via a network and network interface 740.

Network interface 740 may include a network adapter that provides for connection of computing device 700 to a network. Network interface 740 may facilitate data exchange between computing device 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 701 or data 702. Program instructions 701 may be executable by a processor (e.g., one or more of processors 710a-710n) to implement one or more embodiments of the present techniques. Instructions 701 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 720 may include a tangible program carrier having program instructions stored thereon. A tangible program carrier may include a non-transitory computer readable storage medium. A non-transitory computer readable storage medium may include a machine-readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 720 may include a non-transitory computer readable storage medium that may have program instructions stored thereon that are executable by a computer processor (e.g., one or more of processors 710a-710n) to cause the subject matter and the functional operations described herein. A memory (e.g., system memory 720) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 750 may be configured to coordinate I/O traffic between processors 710a-710n, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing device 700 or multiple computing device 700 configured to host different portions or instances of embodiments. Multiple computing devices 700 may provide for parallel or sequential processing/execution of one or more portions of the techniques described herein.

Those skilled in the art will appreciate that computing device 700 is merely illustrative and is not intended to limit the scope of the techniques described herein. Computing device 700 may include any combination of devices or software that may perform or otherwise provide for the performance of the techniques described herein. For example, computing device 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing device 700 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing device 700 may be transmitted to computing device 700 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine-readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: obtaining, by a computer system, an identity risk query identifying a user identification of a user; retrieving, by the computer system and from a security database of compromised user information associated with a plurality of users, first compromised user information associated with the user identification; generating, by the computer system, a first identity risk score for the user based on the first compromised user information; and providing, by the computer system, the first identity risk score in response to the identity risk query.
2. The medium of embodiment 1, wherein the identity risk query originates from an application.
3. The medium of embodiment 2, wherein the identity risk query is generated during an interaction point of a user interaction cycle with the application.
4. The medium of embodiment 3, wherein the application uses the first identity risk score to generate a security action based on the first identity risk score.
5. The medium of embodiment 4, wherein the security action is a second level of authentication when the interaction point is a first level of authentication of the user and the first identity risk score satisfies a security risk condition.
6. The medium of embodiment 4, wherein the security action is an acceptance of the interaction point to proceed to a subsequent interaction point in the user interaction cycle when the first identity risk score does not satisfy a security risk condition.
7. The medium of any one of embodiments 1-6, wherein the first identity risk score is based on a type of an interaction point of a user interaction cycle with an application.
8. The medium of any one of embodiments 1-7, wherein the operations further comprise:
   updating, by the computer system, the security database with updated compromised information associated with the plurality of users and any additional users.
9. The medium of embodiment 8, wherein the operations further comprise: receiving, by the computer system, a second identity risk query for the user at a subsequent time; accessing, by the computer system, the security database of updated compromised information; identifying, by the computer system, that the user is associated with second compromised information of the updated compromised information included in the security database; generating, by the computer system, a second identity risk score for the user based on the second compromised information, wherein the second identity risk score is different than the first identity risk score; and providing, by the computer system, the second identity risk score in response to the second identity risk query.
10. The medium of any one of embodiments 1-9, wherein the identifying that the user is associated with the first compromised user information of the compromised user information included in the security database includes: perform, in response to the identity risk query and utilizing lambda functions, a plurality of calls in parallel to a distributed database that includes the compromised user information; and receiving the first compromised user information from at least some of the plurality of calls.

11. The medium of embodiment 10, wherein the distributed database includes over one billion assets.

12. The medium of embodiment 11, wherein the first compromised user information is received within 500-900 msecs.

13. The medium of any one of embodiments 1-12, wherein the first compromised user information includes lack of information about the user.

14. The medium of any one of embodiments 1-13, wherein the identity risk query includes a user identifier and the user identifier is used to perform identification of the first compromised user information.

15. The medium of embodiment 14, wherein the operations further comprise: performing a search for one or more alternative user identifiers based on the user identifier provided, wherein alternative user identifiers are obtained from data assets where the user identifier is listed and one or more alternative user identifiers are listed, wherein the identifying that the user is associated with the first compromised user information includes searching the security database with the user identifier and the alternative user identifiers.

16. The medium of any one of embodiments 1-15, wherein the generating the first identity risk score based on the first compromised user information is based on at least one of: at least a portion of the first compromised user information being harvested by malware, at least a portion of the first compromised user information including a browser fingerprint, a lack of first compromised user information, at least a portion of the first compromised user information including exposed credentials, a determination, from the first compromised user information, that password usage satisfies a password risk condition, inconsistencies between other user data provided in the identity risk query and the first compromised user information, or a recency in the first compromised user information.

17. The medium of any one of embodiments 1-16, wherein the operations further comprise: providing, with the identity risk score, identity risk factors that impacted the first identity risk score.

18. The medium of any one of embodiments 1-17, wherein the operations further comprise steps for: identifying the first compromised user information.

19. The medium of any one of embodiments 1-18, wherein the operations further comprise steps for: generating the first identity risk score.

20. A process comprising: the operations of any one of embodiments 1-19.

21. A system, comprising: one or more processors; and memory storing instructions that when executed by the processors cause the processors to effectuate operations comprising: the operations of any one of embodiments 1-19.

What is claimed is:

1. A non-transitory, machine-readable medium storing instructions that, when executed by one or more processors, effectuate operations comprising:
obtaining, by a computer system, an identity risk query identifying a user identification of a user;
retrieving, by the computer system and from a security database of compromised user information associated with a plurality of users, first compromised user information associated with the user identification, wherein the security database of the compromised user information associated with the plurality of users includes a portion of the compromised user information that was obtained by malware, wherein the retrieving includes:
performing, in response to the identity risk query and utilizing lambda functions, a first plurality of calls in parallel to the security database that includes the compromised user information,
receiving a first portion of the first compromised user information from at least some of the first plurality of calls,
performing, utilizing lambda functions and information obtained from the first plurality of calls, a second plurality of calls in parallel to the security database, and
receiving a second portion of the first compromised user information from at least some of the second plurality of calls;
generating, by the computer system, a first identity risk score for the user based on the first compromised user information, wherein the generating the first identity risk score based on the first compromised user information is based at least on a portion of the first compromised user information being harvested by malware; and
providing, by the computer system, the first identity risk score in response to the identity risk query.

2. The medium of claim 1, wherein the identity risk query originates from an application.

3. The medium of claim 2, wherein the identity risk query is generated during an interaction point of a user interaction cycle with the application.

4. The medium of claim 3, wherein the application uses the first identity risk score to generate a security action based on the first identity risk score.

5. The medium of claim 4, wherein the security action is a second level of authentication when the interaction point is a first level of authentication of the user and the first identity risk score satisfies a security risk condition.

6. The medium of claim 4, wherein the security action is an acceptance of the interaction point to proceed to a subsequent interaction point in the user interaction cycle when the first identity risk score does not satisfy a security risk condition.

7. The medium of claim 1, wherein the first identity risk score is based on a type of an interaction point of a user interaction cycle with an application.

8. The medium of claim 1, wherein the operations further comprise:
updating, by the computer system, the security database with updated compromised information associated with the plurality of users and any additional users.

9. The medium of claim 8, wherein the operations further comprise:
receiving, by the computer system, a second identity risk query for the user at a subsequent time;
accessing, by the computer system, the security database of updated compromised information;
identifying, by the computer system, that the user is associated with second compromised information of the updated compromised information included in the security database;

generating, by the computer system, a second identity risk score for the user based on the second compromised information, wherein the second identity risk score is different than the first identity risk score; and providing, by the computer system, the second identity risk score in response to the second identity risk query.

10. The medium of claim 1, wherein the first compromised user information is received within 500-900 msecs.

11. The medium of claim 1, wherein the first compromised user information includes lack of information about the user.

12. The medium of claim 1, wherein the identity risk query includes a user identifier and the user identifier is used to perform identification of the first compromised user information.

13. The medium of claim 12, wherein the operations further comprise:
performing a search for one or more alternative user identifiers based on the user identifier provided, wherein alternative user identifiers are obtained from data assets where the user identifier is listed and one or more alternative user identifiers are listed, wherein the identifying that the user is associated with the first compromised user information includes searching the security database with the user identifier and the alternative user identifiers.

14. The medium of claim 1, wherein the generating the first identity risk score based on the first compromised user information is based on at least one of:
at least a portion of the first compromised user information including a browser fingerprint,
a lack of first compromised user information,
at least a portion of the first compromised user information including exposed credentials,
a determination, from the first compromised user information, that password usage satisfies a password risk condition,
inconsistencies between other user data provided in the identity risk query and the first compromised user information, or
a recency in the first compromised user information.

15. The medium of claim 1, wherein the operations further comprise:
providing, with the identity risk score, identity risk factors that impacted the first identity risk score.

16. The medium of claim 1, wherein the operations further comprise steps for:
identifying the first compromised user information.

17. The medium of claim 1, wherein the operations further comprise steps for:
generating the first identity risk score.

18. A method, comprising:
receiving, by a computer system, an identity risk query for a user;
accessing, by the computer system, a security database of available user information associated with a plurality of users;
identifying, by the computer system, that the user is associated with first available user information of the available user information included in the security database, wherein the security database of the available user information associated with the plurality of users includes a portion of the available user information that was obtained by malware, wherein the identifying includes:
performing, in response to the identity risk query and utilizing lambda functions, a first plurality of calls in parallel to the security database that includes the available user information,
receiving a first portion of the first available user information from at least some of the first plurality of calls,
performing, utilizing lambda functions and information obtained from the first plurality of calls, a second plurality of calls in parallel to the security database, and
receiving a second portion of the first available user information from at least some of the second plurality of calls;
generating, by the computer system, a first identity risk score for the user based on the first available user information, wherein the generating the first identity risk score based on the first available user information is based at least on a portion of the first available user information being harvested by malware; and
providing, by the computer system, the first identity risk score in response to the identity risk query.

19. The method of claim 18, wherein the identity risk query originates from an application.

20. The method of claim 19, wherein the identity risk query is generated during an interaction point of a user interaction cycle with the application.

21. The method of claim 20, wherein the application uses the first identity risk score to generate a security action based on the first identity risk score.

22. The method of claim 21, wherein the security action is a second level of authentication when the interaction point is a first level of authentication of the user and the first identity risk score satisfies a security risk condition.

23. The method of claim 21, wherein the security action is an acceptance of the interaction point to proceed to a subsequent interaction point in the user interaction cycle when the first identity risk score does not satisfy a security risk condition.

24. The method of claim 18, wherein the first identity risk score is based on a type of an interaction point of a user interaction cycle with an application.

25. The method of claim 18, further comprising:
updating, by the computer system, the security database with updated compromised information associated with the plurality of users and any additional users.

26. The method of claim 25, further comprising:
receiving, by the computer system, a second identity risk query for the user at a subsequent time;
accessing, by the computer system, the security database of updated compromised information;
identifying, by the computer system, that the user is associated with second compromised information of the updated compromised information included in the security database;
generating, by the computer system, a second identity risk score for the user based on the second compromised information, wherein the second identity risk score is different than the first identity risk score; and
providing, by the computer system, the second identity risk score in response to the second identity risk query.

27. The method of claim 18, wherein the first compromised user information is received within 500-900 msecs.

28. The method of claim 18, wherein the first compromised user information includes lack of information about the user.

29. The method of claim 18, wherein the identity risk query includes a user identifier and the user identifier is used to perform identification of the first compromised user information.

30. The method of claim 29, further comprising:
performing a search for one or more alternative user identifiers based on the user identifier provided, wherein alternative user identifiers are obtained from data assets where the user identifier is listed and one or more alternative user identifiers are listed, wherein the identifying that the user is associated with the first compromised user information includes searching the security database with the user identifier and the alternative user identifiers.

31. The method of claim 18, wherein the generating the first identity risk score based on the first compromised user information is based on at least one of:
at least a portion of the first compromised user information including a browser fingerprint,
a lack of first compromised user information,
at least a portion of the first compromised user information including exposed credentials,
a determination, from the first compromised user information, that password usage satisfies a password risk condition,
inconsistencies between other user data provided in the identity risk query and the first compromised user information, or
a recency in the first compromised user information.

32. The method of claim 18, further comprising:
providing, with the identity risk score, identity risk factors that impacted the first identity risk score.

33. The method of claim 18, wherein the operations further comprise steps for:
identifying the first compromised user information.

34. The method of claim 18, further comprising steps for:
generating the first identity risk score.

* * * * *